United States Patent [19]

Schipper, Jr. et al.

[11] Patent Number: 4,759,420

[45] Date of Patent: Jul. 26, 1988

[54] STEERING GEAR WITH SPEED SENSITIVE DETENT SWITCH

[75] Inventors: William R. Schipper, Jr., Clio; James J. St. Germain, Jr.; Dennis J. Jones, both of Saginaw, all of Mich.

[73] Assignee: General Motors Corporation, Detroit, Mich.

[21] Appl. No.: 74,087

[22] Filed: Jul. 16, 1987

[51] Int. Cl.$^4$ ............................................. B62D 5/083
[52] U.S. Cl. ................................. 180/143; 74/388 PS; 91/375 A; 137/625.24; 180/148; 251/297
[58] Field of Search ............... 180/143, 142, 141, 148; 91/375 A, 426; 137/596.13, 625.24; 251/297; 74/388 PS

[56] References Cited

U.S. PATENT DOCUMENTS

| | | | |
|---|---|---|---|
| 3,022,772 | 2/1962 | Zeigler et al. | 91/375 A |
| 3,998,131 | 12/1976 | Adams | 91/375 A X |
| 4,034,825 | 7/1977 | Adams | 180/143 |
| 4,601,358 | 7/1986 | Kozuka et al. | 180/141 |
| 4,621,704 | 11/1986 | Kozuka | 180/143 |

FOREIGN PATENT DOCUMENTS 61-05152 9/1986 Japan .................................. 180/143

Primary Examiner—David M. Mitchell
Assistant Examiner—Mitchell J. Hill
Attorney, Agent, or Firm—Saul Schwartz

[57] ABSTRACT

A speed sensitive detent system for a variable effort power steering gear. A detent support portion on the output member of the steering gear has a plurality of internally threaded radial insert bores therein. A detent insert is threaded into each insert bore and includes a detent bore the centerline of which is offset from the centerline of the corresponding detent insert. A detent ball is received in each detent bore and biased by a servo fluid pressure into a detent groove in the input member of the steering gear angularly aligned with the insert bore. After the rotary valve of the steering gear is balanced during assembly of the gear, the detent inserts are rotated in their insert bores until the centerlines of the detent bores intersect the centers of the detent grooves so that the detent balls do not upset the hydraulic balance of the rotary valve when biased into the grooves by the servo fluid pressure.

4 Claims, 1 Drawing Sheet

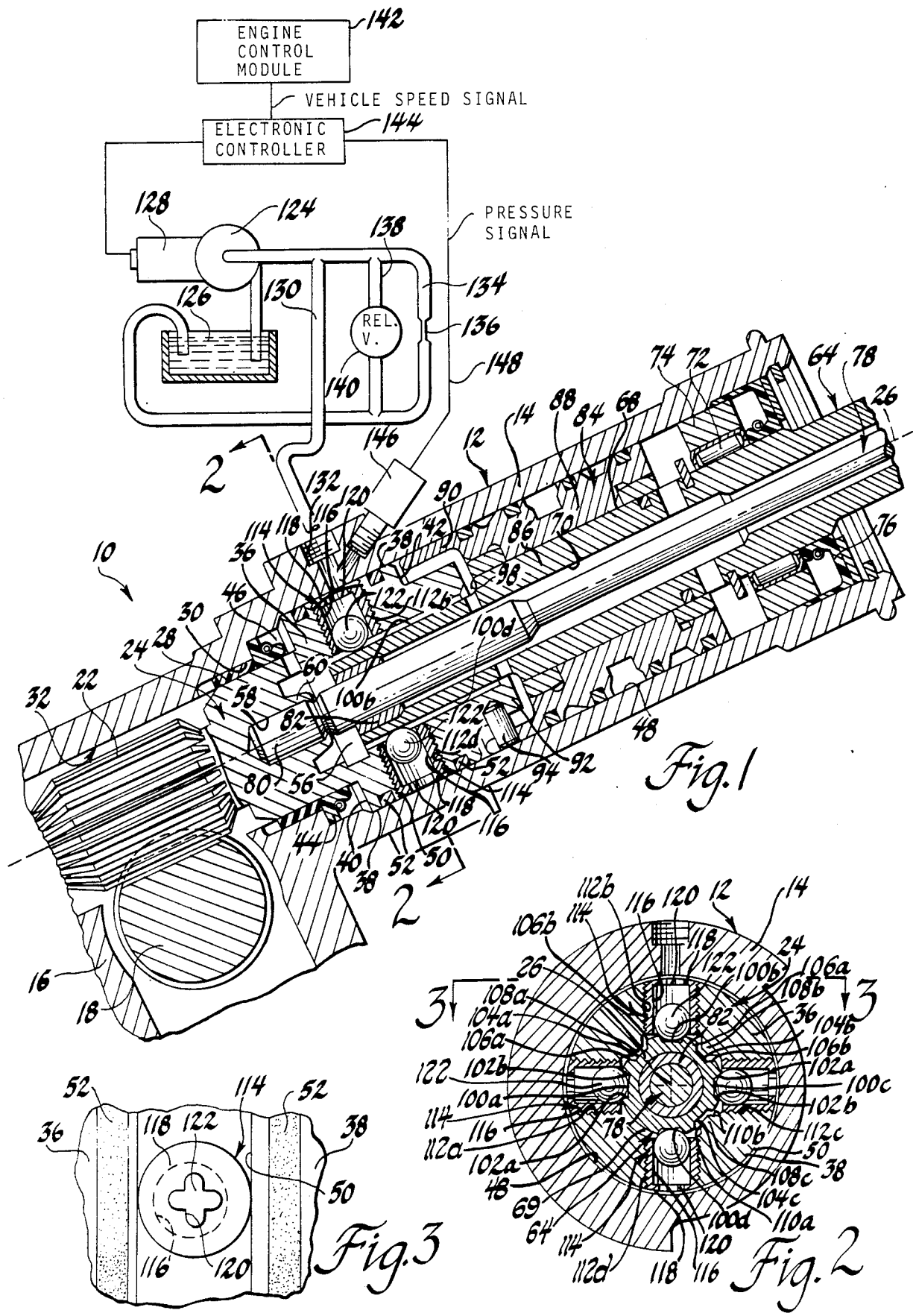

STEERING GEAR WITH SPEED SENSITIVE DETENT SWITCH

BACKGROUND OF THE INVENTION

1. Field of the Invention

This invention relates generally to automotive power steering gears and, more particularly, to variable effort power steering gears where power assist varies with vehicle speed.

2. Description of the Prior Art

In typical rotary valve type automotive power steering gears, a torsion bar is disposed between an input or stub shaft connected to the steering wheel of the vehicle and an output or pinion shaft connected to the steered road wheels of the vehicle. With no manual steering torque at the steering wheel, the torsion bar maintains a balanced, open center relationship between a valve spool on the stub shaft and a valve sleeve rotatable as a unit with the pinion shaft. In addition, the torsion bar resiliently resists angular deflection of the steering wheel and stub shaft relative to the pinion shaft which resistance is sensed by the operator as "road feel". Ideally, road feel is minimum during low speed or parking maneuvers and maximum at higher vehicle speeds normally associated with highway driving. To that end, detent type variable effort power steering gears have been proposed wherein one or more detents are slidably received in radial bores in a housing connected to the pinion shaft and are urged by a servo fluid pressure proportional to vehicle speed into grooves in the stub shaft. The detents connect the stub shaft to the pinion shaft for unitary rotation until the manual torque applied at the steering wheel achieves a threshold magnitude sufficient to ramp the detents out of the grooves. Thereafter, as the stub shaft rotates relative to the pinion shaft, the rotary valve operates in its usual fashion to port pressurized fluid to the steering assist fluid motor. An automotive power steering gear according to this invention is an improved detent type variable effort power steering gear.

SUMMARY OF THE INVENTION

This invention is an improved detent type variable effort automotive power steering gear wherein two pairs of diametrically opposite detent balls are closely received in radial bores in adjustable detent inserts disposed on a rigid extension of the pinion shaft and are urged into longitudinal detent grooves in the stub shaft by a servo fluid pressure proportional to vehicle speed. The servo fluid pressure is developed by an electric motor driven pump. An electronic control module (ECM) on the vehicle provides a signal indicative of vehicle speed programmed with a schedule of servo fluid pressures for the full range of vehicle speed. An electronic controller receives the ECM speed signal and is programmed to energize the pump motor to produce a schedule servo fluid pressure for the signaled speed. The electronic motor controller receives a feedback signal from a fluid pressure transducer indicative of actual servo fluid pressure and adjusts the speed of the pump motor to produce an actual servo fluid pressure which equals the scheduled servo fluid pressure. In the improved power steering gear according to this invention, the adjustable detent inserts are rotatable about radial axes and have eccentric detent bores therein for the detent balls. During assembly of the steering gear, after the rotary valve is balanced, the inserts are rotated as necessary to provide an exactly centered relationship between each of the detent balls and the corresponding ones of the detent grooves in the stub shaft whereby valve bias due to manufacturing tolerance stack-up is avoided.

BRIEF DESCRIPTION OF THE DRAWINGS

FIG. 1 is a longitudinal sectional view of a portion of a detent type variable effort power steering gear according to this invention;

FIG. 2 is a sectional view taken generally along the plane indicated by lines 2—2 in FIG. 1; and FIG. 3 is a sectional view taken generally along the plane indicated by lines 3—3 in FIG. 2.

DESCRIPTION OF A PREFERRED EMBODIMENT

Referring to FIG. 1 of the drawings, a partially illustrated detent type variable effort power steering gear 10 according to this invention includes a main housing 12 having a cylindrical rotary valve portion 14 and an integral rack support portion 16. A steering rack 18 is disposed on the rack support portion 16 of the housing 12 for bodily shiftable movement in the direction of its longitudinal axis. Rack teeth on the steering rack 18 mesh with gear teeth of a pinion gear 22 formed integrally on a pinion shaft 24. The pinion shaft 24 is aligned on a pinion axis 26 of the housing 12. The mid-portion of the pinion shaft is journaled on the housing 12 for rotation about the axis 26 by a sleeve bearing 28 disposed in a stepped portion 30 of a bore 32 in the housing 12 aligned on the axis 26. The bearing 28 cooperates with another bearing, not shown, on the opposite side of the pinion gear 22 in supporting the pinion shaft 24 on the housing 12 for rotation about the axis 26.

With reference to FIGS. 1 and 2, the pinion shaft 24 has a detent support portion 36 at the end thereof to the right of sleeve bearing 28. The detent support portion includes a cylindrical outer wall 38 centered on the axis 26 and bounded on opposite sides by a pair of annular shoulders 40 and 42 of the pinion shaft in planes perpendicular to the axis 26. A fluid seal 44 is disposed in a chamber 46 between the housing 12 and the pinion shaft 24. The cylindrical outer wall 38 is closely received in a cylindrical bore 48 of the rotary valve portion 14 of the housing 12 centered on the axis 26. The outer wall 38 has an annular groove 50 therein facing the bore 48. The groove is flanked on opposite sides by a pair of elastomeric seal rings 52 on the detent support portion of the pinion shaft which provide fluid seals between the outer wall 38 and the bore 48 on opposite sides of the groove 50.

The detent support portion 36 has an enlarged cavity 56 therein which is open through the right end of the detent support portion. The cavity 56 is centered on the axis 26 and has a blind bore 58 in a bottom wall thereof similarly aligned on the axis 26. The blind bore 58 is surrounded by an annular lip 60 of the pinion shaft 24.

A tubular stub shaft 64 projects into the rotary valve portion 14 of the housing 12 and is aligned on the axis 26. The right or outboard end of the stub shaft, not shown, outside of the housing 12 is connected by conventional means to a vehicle steering wheel. The stub shaft has a large diameter cylindrical outer wall 68, a small diameter cylindrical outer wall 69, and a stepped internal bore 70 each centered on the axis 26. A roller bearing 72 on a spacer ring 74 engages the stub shaft on the outer wall 68 thereof and supports the stub shaft at the mid-portion thereof on the housing 12 for rotation about the axis 26. A seal 76 outboard of the bearing 72 prevents internal contamination of the steering gear and fluid loss.

A cylindrical torsion rod 78 is aligned on the axis 26 within the internal bore 70 of the stub shaft 64. A serrated inboard end 80 of the torsion rod 78 is pressed into the blind bore 58 in the pinion shaft 24 and the lip 60 is crimped around the torsion rod whereby the inboard end of the torsion rod is rigidly connected to the pinion shaft for rotation as a unit therewith about the axis 26. The right or outboard end, not shown, of the torsion rod is rigidly connected to the outboard end of the stub shaft 64 for rotation as a unit therewith about the axis 26. The stub shaft 64 is journaled on the torsion rod 78 by a sleeve bearing 82 disposed in the internal bore 70 of the stub shaft at the left or inboard end of the latter. The torsion rod and the sleeve bearing cooperate to support the inboard end of the stub shaft 64 on the housing 12 for rotation about the axis 26 independent of the torsion rod.

The power steering gear 10 further includes a generally conventional rotary valve 84 in the rotary valve portion 14 of the housing 12. A suitable rotary valve is described in U.S. Pat. No. 3,022,772, issued to Zeigler et al on Feb. 27, 1962 and assigned to the assignee of this invention. Basically, the rotary valve 84 includes a valve spool 86, represented by the portion of the large diameter cylindrical outer wall 68 of the stub shaft between the bearing 72 and the detent support portion 36, and a sleeve 88 around the spool. The sleeve 88 is closely received in the bore 48 of the housing 12 with an annular flange portion 90 surrounding a reduced diameter end 92 of the detent support portion 36 of the pinion shaft 24. A radial pin 94 between the flange portion 90 and the reduced diameter end 92 connects the sleeve 88 to the pinion shaft 24 for unitary rotation about the axis 26.

Longitudinal grooves and lands, not shown, on the facing surfaces of the sleeve 88 and the spool 86 cooperate to port pressure fluid from a source, such as an engine driven power steering pump, to an appropriate one of a pair of steering assist fluid motor chambers, not shown, in accordance with relative angular displacement between the spool and the sleeve. Likewise, the grooves and lands cooperate to port the other of the fluid motor chambers to an exhaust. With no steering input at the steering wheel, the torsion rod 78 maintains the spool 86 and the sleeve 88 in an open center relationship wherein the power steering pump is simultaneously ported to both fluid motor chambers and to the exhaust.

As seen best in FIGS. 1 and 2, the small diameter cylindrical outer wall 69 on the stub shaft 64 extends from the inboard end of the stub shaft to a shoulder 98 between the large and small diameter outer walls 68 and 69. The small diameter outer wall 69 has four axially extending detent grooves 100a–d therein arranged in diametrically opposite pairs 100a/c and 100b/d. Each detent groove extends substantially the full length of the small diameter outer wall and has a pair of side walls 102a–b which diverge in the outward radial direction. The small diameter outer wall 69 is further interrupted by three axially extending spline grooves 104a–c arranged, respectively, between adjacent pairs of detent grooves 100a/b, 100b/c and 100c/d. Each of the spline grooves has a pair of side walls 106a–b which diverge in the radially outward direction.

The internal wall of the detent support portion 36 leading to the cavity 56 has a plurality of spline teeth thereon, only three spline teeth 108a–c being shown in FIG. 2, extending axially from the right end of the pinion shaft to the cavity 56. The spline teeth are angularly spaced at intervals corresponding to the angular intervals between the spline grooves 104a–c and the detent grooves 100a–d on the stub shaft 64. Each spline tooth has a pair of side walls 110a–b which diverge in the radially outward direction. The spline teeth 108a–c fit into the spline grooves 104a–c, respectively, with calculated clearance between the side walls 110a–b of the spline teeth and the facing side walls 106a–b of the spline grooves so that the stub shaft 64 is rotatable relative to the pinion shaft through a calculated included angle before the spline teeth side walls engage the spline groove side walls. The spline teeth in registry with the detent grooves 100a–d, hidden in FIG. 2, have similar calculated clearances relative to the side walls 102a–b of the grooves.

The detent support portion 36 of the pinion shaft 24 has four internally threaded insert bores 112a–d therein extending from the bottom of the groove 50 in the cylindrical outer wall 38 to the internal wall of the detent support portion leading to chamber 56. The bores are aligned radially relative to the axis 26 and in a plane perpendicular to the latter and are arranged in diametrically opposite pairs 112a/c and 112b/d. The insert bores 112a–d receive respective ones of four cylindrical, externally threaded detent inserts 114. Each detent insert has a detent bore 116 therein the centerline of which is located eccentrically relative to the longitudinal centerline of the threaded outer surface of the insert. The detent bore in each insert terminates at an end wall 118 of the insert at the radially outboard end of the bore. Each end wall 118 is perforated by a centrally located cross-shaped slot 120, FIG. 3. Respective ones of for detent balls 122 are closely but slidably received in the detent bores 116. The detent balls normally project into respective ones of the detent grooves 100a–d wherein the balls engage the side walls of the grooves.

As seen best in FIG. 1, an auxiliary pump 124 draws fluid from a reservoir 126 and is driven by an electric motor 128 at variable speeds corresponding to the level of energization of the motor. The output of the pump is proportional to the speed at which the pump is driven and is ducted to the annular groove 50 in the detent support portion 36 through a supply duct 130 and a port 132 in the housing 12. A second duct 134 branches from the supply duct 130 to the reservoir 126 and has an orifice 136 therein. A third duct 138 with a relief valve 140 therein bypasses the orifice in the second duct 134.

The control system for the motor 128 includes an electronic control module (ECM) 142 of the vehicle, an electronic motor controller 144, and a feedback pressure transducer 146. The internal structure and the operation of the ECM 142, the motor controller 144, and the transducer 146 are conventional and form no part of this invention. The ECM is connected to the controller 144 and provides an electronic signal to the latter indicative of vehicle speed. The controller 144 is programmed to energize the motor 128 to produce a unique scheduled servo fluid pressure for the speed signaled by the ECM. At the same time, the controller 144 receives a feedback signal indicative of actual servo fluid pressure from the servo fluid pressure transducer 146 which is mounted on the housing 12 in fluid communication with the port 132 and connected to the controller 144 through a conductor 148. The controller 144 adjusts the speed of the pump motor to produce an actual servo fluid pressure equal to the scheduled servo fluid pressure.

The steering gear 10 operates as follows. When the vehicle is stationary with the engine running and no manual torque is applied at the steering wheel, the torsion rod 78 maintains the open center relationship between the valve spool 86 and the valve sleeve 88. Fluid from the power steering pump circulates at low pressure through the rotary valve and back to the reservoir of the pump. The controller 144 schedules zero servo fluid pressure at zero speed so the electric motor 128 is off. With no servo fluid pressure, the detent balls 122 are freely slidable in their respective detent bores 116.

If manual torque is applied at the steering wheel while the vehicle is stationary, the stub shaft 64 rotates in the corresponding direction against the reistance of the torsion rod 78. Stub shaft rotation is accompanied by rotation of the valve spool 86 relative to the valve sleeve 88 whereby fluid from power steering pump is ported to the fluid motor to assist steering. Concurrently, the appropriate ones of the detent groove side walls 102a–b ramp the corresponding ones of the detent balls 122 radially out of the detent grooves. The detent balls, thus, do not inhibit relative rotation between the stub shaft and the pinion shaft. If so much manual torque is applied at the steering wheel that the torsion rod 78 is overpowered, a direct mechanical connection is established through the side walls 106a–b and 110a–b of the spline grooves and the spline teeth in accordance with the direction in which the steering wheel is turned.

As the speed or forward velocity of the vehicle increases from standstill, the electronic controller 144 energizes the motor 128 to produce steadily increasing scheduled servo fluid pressures in the groove 50. Based on signals from the transducer 146, the controller 144 energizes the motor 128 to produce actual servo fluid pressure equal to scheduled servo fluid pressure. The fluid circulates into each of the detent bores 116 through corresponding ones of the slots 120. The scheduled servo fluid pressure reacts against the detent balls 122 and presses the latter against the side walls 102a–b of the detent grooves with forces proportional to the scheduled servo fluid pressure and, hence, proportional to the speed of the vehicle.

In the presence of servo fluid pressure in the detent bores 116, the detent balls 122 prevent angular displacement of the stub shaft 64 relative to the pinion shaft 24 until a threshold steering torque input at the steering wheel is exceeded. The threshold steering torque is the torsional input at steering wheel at which the side walls 102a–b of the detent grooves will start to ramp the detent balls 122 radially outward against the scheduled servo fluid pressure. Accordingly, below the threshold steering torque, steering is manual or unassisted. Above the threshold steering torque, the stub shaft 64 rotates relative to the pinion shaft so that the rotary valve 84 operates in its otherwise normal fashion to port fluid from the power steering pump to the fluid motor to achieve steering assist. Because the threshold steering torque depends upon the magnitude of the servo fluid pressure on the detent balls, the threshold steering torque increases as the speed of the vehicle increases.

The eccentricity of the detent bores 116 in the detent inserts 114 is an important feature of this invention. At highway speeds with little or no manual torque applied at the steering wheel, the torsion rod 78 maintains the open center relationship between the valve sleeve and the valve spool. At the same time, the servo fluid pressure on the detent balls 112 is high so that each is strongly biased into the corresponding one of the detent grooves 100a–d. If the centerlines of the detent bores 116 do not substantially exactly intersect the centers of the corresponding detent grooves, as may occur through manufacturing tolerance stack-up, the detent balls might alter the open center relationship between the valve spool and the valve sleeve and thereby bias the power steering fluid motor one way or the other. During assembly of the power steering gear 10, however, after the open center relationship between the spool and the sleeve is established, the detent inserts are angularly adjusted in the threaded bores 116. This is effected by a tool, such as a screwdriver blade inserted in the cross slots 120, which rotates the inserts until the center lines of the detent bores 116 intersect the corresponding ones of the detent grooves exactly in the centers of the grooves. Accordingly, the power steering gear 10 is not subject to the aforesaid bias at highway speeds.

The feedback pressure transducer 146 is, likewise, an important feature of this invention. The servo fluid pressure at the port 32 is effected by the viscosity of the fluid which, in turn, is effected by variables such as temperature. Accordingly, for a given vehicle speed, the actual servo fluid pressure at the port 132 could be different than the scheduled servo fluid pressure even though the motor might in fact be driving the pump 124 at a speed which would produce the scheduled servo fluid pressure under other conditions. The transducer 146, however, continuously monitors the actual servo fluid pressure acting on the detent balls so that the controller 144 can adjust the speed of motor 128 to achieve the scheduled servo fluid pressure regardless of the viscosity of the fluid.

The embodiments of the invention in which an exclusive property or privilege is claimed are defined as follows:

1. In a power steering gear for an automotive vehicle, said power steering gear being of the type having
   an input member rotatable about an axis of said steering gear and connected to a steering wheel,
   an output member rotatable about said axis and connected to a pair of steerable road wheels,
   a rotary valve including a valve sleeve rotatable as a unit with said output member and a valve spool rotatable as a unit with said input member, and
   a torsion rod aligned on said axis with a first end attached to said input member and a second end attached to said output member said dentent grooves
      said torsion rod being operative to maintain an open center relationship between said valve spool and said valve sleeve in the absence of torque input at said steering wheel,
   a speed sensitive detent system comprising:
   means on said input member defining a plurality of longitudinal detent grooves at circumferentially spaced locations on a cylindrical outer wall of said input member, said detent grooves having a pair of side walls diverging in the radially outward direction,
   a corresponding plurality of detent inserts each having a cylindrical detent bore therein,
   means on said output member defining a corresponding plurality insert bores in a plane perpendicular to said axis and extending radially relative thereto and nominally angularly aligned with respective ones of said detent grooves, means mounting each of said detent inserts in respective ones of said insert bores for adjustable movement relative thereto whereby each of said inserts is independently adjustable until the centerline of said detent bore therein intersects the center of the corresponding one of said detent grooves, a corresponding plurality of detent members slidably disposed in respective ones of said detent bores and engageable on said side walls of the corresponding one of said detent grooves, servo fluid pressure means on said vehicle operative to provide a scheduled servo fluid pressure having a magnitude proportional to the forward velocity of said vehicle, means porting said scheduled servo fluid pressure to each of said detent bores radially outboard of said detent members whereby said detent members are biased into said detent grooves with forces proportional to the forward velocity of said vehicle, and feedback pressure transducer means between said detent bores and said servo fluid pressure means operative to continuously monitor the actual magnitude of said servo fluid pressure in said detent bores and to provide an electronic signal proportional thereto to said servo fluid pressure means whereby said servo fluid pressure means is caused to produce an actual servo fluid pressure equal to said scheduled servo fluid pressure.

2. The speed sensitive detent system recited in claim 1 wherein:

each of said detent inserts is a cylinder having a cylindrical outside surface threaded over the full length of said detent insert and a cylindrical detent bore therein the centerline of which is offset from the centerline of said cylindrical outside surface, each of said insert bores is internally threaded along the full length of each of said insert bores, and each of said detent inserts is threaded into a respective one of said insert bores so that rotation of each of said detent inserts effects orbital movement of the corresponding one of said detent bores about the centerline of said outside cylindrical surface of said detent insert.

3. The speed sensitive detent system recited in claim 2 wherein:

each of said detent members is a detent ball closely received in a respective one of said detent bores.

4. In a power steering gear for an automotive vehicle, said power steering gear being of the type having a tubular stub shaft rotatable about an axis of said steering gear and connected to a steering wheel, a pinion shaft rotatable about said axis and connected to a pair of steerable road wheels, a rotary valve including a valve sleeve rotatable as a unit with said pinion shaft and a valve spool rotatable as a unit with said stub shaft, and a torsion rod aligned on said axis within said stub shaft with a first end attached to said stub shaft and a second end attached to said pinion shaft, said torsion rod being operative to maintain an open center relationship between said valve spool and said valve sleeve in the absence of steering torque input at said steering wheel, a speed sensitive detent system comprising:

means on said stub shaft defining a plurality of longitudinal detent grooves at circumferentially spaced locations on a cylindrical outer wall of said stub shaft said detent grooves having a pair of side walls diverging in the radially outward direction, a corresponding plurality of cylindrical detent inserts each having an outside cylindrical surface threaded over the full length of said insert and a detent bore therein extending from one end of said insert to an end wall of said insert and a slot through said end wall opening into said detent bore, the centerline of each of said detent bores being offset from the centerlines of the corresponding ones of said outside cylindrical surfaces on said detent inserts, means on said output member defining a corresponding plurality of internally threaded insert bores in a plane perpendicular to said axis and extending radially relative thereto and nominally angularly aligned with respective ones of said detent grooves, each of said detent inserts being threaded into respective ones of said insert bores so that rotation of said inserts effects corresponding orbital movement of said detent bores about the centerlines of said outside cylindrical surfaces of said detent inserts whereby each of said detent inserts is independently adjustable until the centerline of said detent bore therein intersects the center of the corresponding one of said detent grooves, a corresponding plurality of detent balls slidably disposed in respective ones of said detent bores and engageable on said side walls of the corresponding one of said detent grooves, a electric motor driven servo fluid pressure pump on said vehicle operative to provide a servo fluid pressure having a magnitude proportional to the speed of said electric motor, means porting said servo fluid pressure to each of said detent bores radially outboard of said detent balls whereby said detent balls are biased against said side walls of said detent grooves with forces proportional to said servo fluid pressure, feedback pressure transducer means operative to continuously monitor the actual magnitude of said servo fluid pressure in said detent bores and to provide an electronic signal proportional to said actual servo fluid pressure magnitude, and electronic control means on said vehicle connected to said electric motor of said servo fluid pressure pump and to said feedback pressure transducer means and to an electronic control module providing an electronic signal indicative of the forward velocity of said vehicle and programmed to energize said electric motor to produce a plurality of unique scheduled servo fluid pressures corresponding to a plurality of vehicle forward velocities, said electronic control means adjusting the energization of said motor of said servo fluid pressure pump in accordance with an electronic signal from said pressure transducer indicative of servo fluid pressure so that actual servo fluid pressure equals said scheduled servo fluid pressure.

* * * * *